(12) United States Patent
Catledge

(10) Patent No.: US 9,104,732 B2
(45) Date of Patent: Aug. 11, 2015

(54) INTERNET PRESENCE SCORING

(71) Applicant: Search Skore, LLC, Henderson, NV (US)

(72) Inventor: James B. Catledge, Henderson, NV (US)

(*) Notice: Subject to any disclaimer, the term of this patent is extended or adjusted under 35 U.S.C. 154(b) by 323 days.

(21) Appl. No.: 13/772,986

(22) Filed: Feb. 21, 2013

(65) Prior Publication Data

US 2014/0236923 A1  Aug. 21, 2014

(51) Int. Cl.
*G06F 17/30* (2006.01)
(52) U.S. Cl.
CPC ............................... *G06F 17/30522* (2013.01)
(58) Field of Classification Search
None
See application file for complete search history.

(56) References Cited

U.S. PATENT DOCUMENTS

| | | | | |
|---|---|---|---|---|
| 8,725,773 | B2* | 5/2014 | Pettit | 707/791 |
| 2006/0242040 | A1* | 10/2006 | Rader | 705/35 |
| 2013/0007012 | A1* | 1/2013 | Selkowe Fertik et al. | 707/748 |
| 2013/0018957 | A1* | 1/2013 | Parnaby et al. | 709/204 |
| 2013/0085803 | A1* | 4/2013 | Mauro et al. | 705/7.29 |
| 2013/0325550 | A1* | 12/2013 | Varghese et al. | 705/7.31 |
| 2013/0325836 | A1* | 12/2013 | Gerwe et al. | 707/706 |

\* cited by examiner

*Primary Examiner* — Robert Beausoliel, Jr.
*Assistant Examiner* — Hau H Hoang
(74) *Attorney, Agent, or Firm* — Kunzler Law Group

(57) ABSTRACT

For scoring Internet presence, a search module retrieves a plurality of search results for a search phrase from a specified data source. A scoring module calculates an Internet score as a function of a sentiment value for each of the plurality of search results.

20 Claims, 7 Drawing Sheets

200

| Search 201 |
| --- |
| Search 201 |
| Search 201 |
| Search 201 |
| Search 201 |

| Search Phrase 202 |
| --- |
| Search Type 204 |
| Time Stamp 206 |
| Search Result 205a |
| Search Result 205b |
| Search Result 205c |
| Search Preferences 216 |
| Search Origin 218 |

| Data Source Record 207 |
| --- |
| Position Data 208 |
| Sentiment Data 210 |
| Geographic Data 212 |
| Review Rating 214 |
| Language Data 220 |
| Raw Data 222 |

272a
TOP BRAND Tennis Racquets
205a — Best for control and power. 274a
www.topbrandracquet.dumby 272b
TOP BRAND search software
205b — Efficient web presence scoring 274b
www.topbrandscore.dumby 272c
Review of TOP BRAND search software
205c — Using TOP BRAND search software was easy and fast.
Www.reviews.dumby 274c

Overall, my experience with TOP BRAND was very satisfying. I did have to wait a long time when I called their customer service line, but they were able to resolve my problem.

| Resolve | 4 |
|---|---|
| Satisfying | 12 |
| Wait | -8 |

| Postion | Available? | Sentiment | Special? |
|---|---|---|---|
| 205a  1 | 1 | 1 | 1 |
| 205b  2 | 1 | | |
| 205c  3 | 1 | | |
| 205d  4 | 1 | -1 | |
| 205e  5 | 1 | -1 | |
| 205f  6 | | | |
| 205g  7 | | | |
| 205h  8 | 1 | | |
| 205i  9 | 1 | | |
| 205j  10 | 1 | | |

INTERNET PRESENCE SCORING

FIELD

The subject matter disclosed herein relates to scoring and more particularly relates to internet presence scoring.

BACKGROUND

Description of the Related Art

Online sources such as Internet web pages, social media, web accessible databases, reviews, and the like are increasingly important in defining public opinion. Evaluating an Internet presence is important for managing advertising, political campaigns, and the like.

BRIEF SUMMARY

A method for Internet presence scoring is disclosed. A search module retrieves a plurality of search results for a search phrase from a specified data source. A scoring module calculates an Internet score as a function of a sentiment value for each of the plurality of search results. An apparatus also performs the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2 is a schematic block diagram illustrating one embodiment of a search database;

FIG. 3 is a schematic block diagram illustrating one embodiment of a search entry;

FIG. 4 is a schematic block diagram illustrating one embodiment of a search result entry;

FIG. 7 is an illustration of one embodiment of displayed search results;

FIG. 8 is an illustration of one embodiment of sentiment identification;

FIG. 9 is an illustration of one embodiment of sentiment scoring;

FIG. 10 is an illustration of one embodiment of position and sentiment scoring;

DETAILED DESCRIPTION

Figure 1:
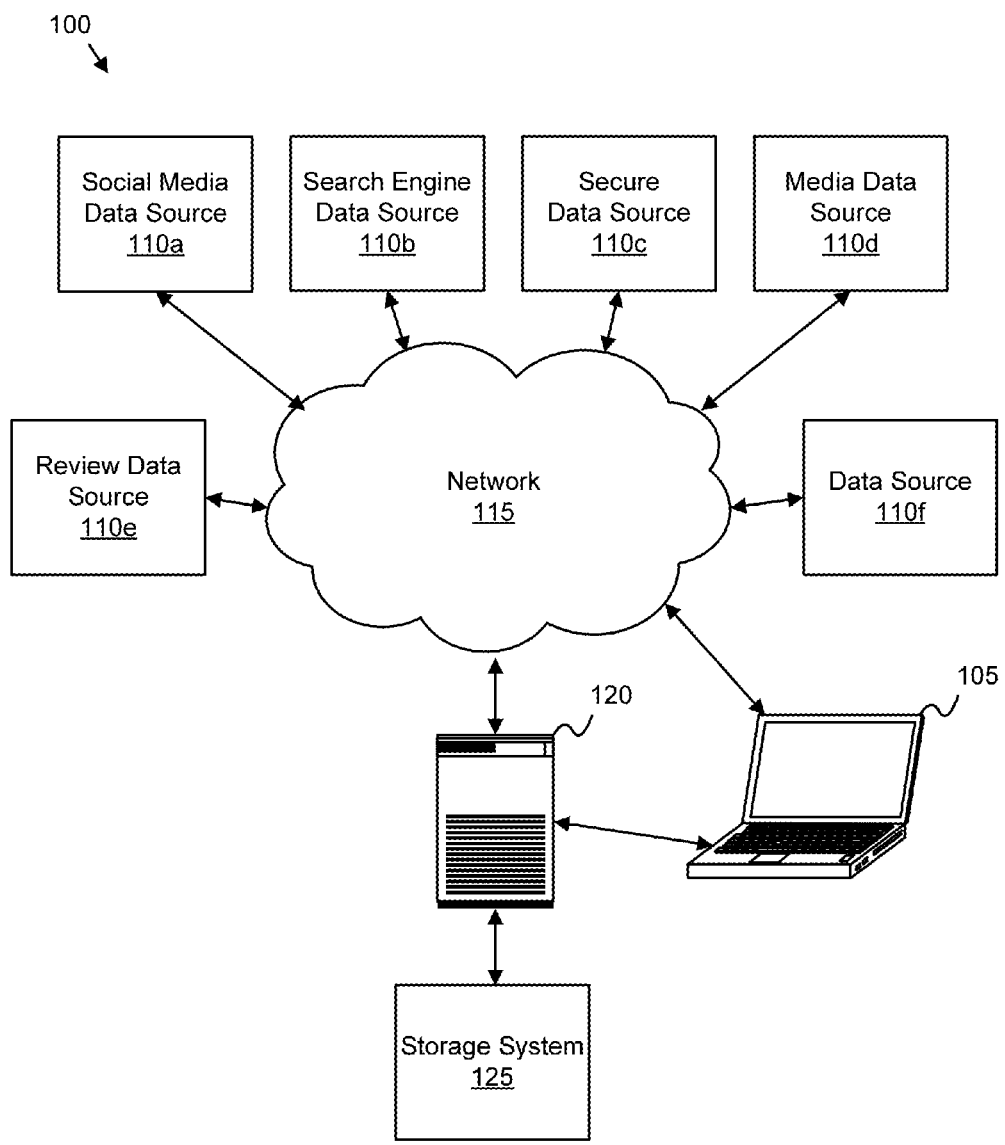
FIG. 1 is a schematic block diagram illustrating one embodiment of an Internet presence scoring system.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of an internet presence scoring system 100. The system 100 includes a plurality of data sources 110, a network 115, a server 120, a search computer 105, and a storage system 125.

The network 115 may comprise the Internet, a local area network, a wide area network, an ad hoc network, a private network, and/or a mobile telephone network. For example, the network 115 may include both the Internet and a private local area network.

The data sources 110 may include without limitation a social media data source 110a, a search engine data source 110b, a secure data source 110c, a media data source 110d, a review data source 110e, and a data source 110f. Each data source 110 may be accessible through the network 115 such as through the Internet, a private network, and the like.

The server 120 may gather search results from the plurality of the data sources 110. In one embodiment, the server 120 performs searches one or more specified data sources 110. The server 120 may perform the searches using preferences. The preferences may include preferences for a specified user, preferences for a specified age group, preferences for a specified income bracket, preferences for a specified gender, and preferences for a specified locality.

The server 120 may store the data in the storage system 125. The data may be organized in one or more databases, database tables, data files, and the like as will be described hereafter.

In a certain embodiment, the server 120 performs the searches through the search computer 105. The search computer 105 may be located in the specified location and have an Internet Protocol (IP) address associated with that location. As a result, the data gathered from the data sources 110 is analogous to the data available to the residence of the specified location.

Search results on the data sources 110 are often indicative of the reputation of an individual, the popularity of a brand, and the penetration in society of a phrase or concept. Understanding this Internet presence is often vital in managing advertising campaigns, political campaigns, public awareness campaigns, product promotions, and the like. Unfortunately, the information that is required to understand the Internet presence for a person, brand, or phrase is widely distributed in numerous data sources 110. This information is too numerous for an individual to gather and comprehend. In addition, understanding the sentiment of the information in each data source 110 may be too numerous and diverse to be consistently evaluated.

The embodiments disclosed herein automatically calculate an Internet score as a function of the sentiment value for each of a plurality of search results from one or more data sources 110. The Internet score objectively and rapidly determines both the quantity and quality of the Internet presence for a brand, an individual, or a phrase. With this information, campaigns can be formulated and adjusted for target audiences to better effect.

FIG. 2 is a schematic block diagram illustrating one embodiment of a search database 200. The search database 200 stores the search results from each search of the data sources 110 as a search entry 201. The search database 200 may be stored on the storage system 125. For example, one or more clients may commission searches. The information from each search may be stored in the search database 200 as a search entry 201.

FIG. 3 is a schematic block diagram illustrating one embodiment of a search entry 201. The search entry 201 is the search entry 201 in the search database 200 of FIG. 2. Each search entry 201 may include a search phrase 202, a search type 204, a timestamp 206, one or more search results 205, search preferences 216, and a search origin 218.

The search phrase 202 may be a brand name, an individual's name, and/or specified phrase. In one embodiment, the search phrase 202 may include one or more variations such as singular versions, plural versions, misspelled versions, and alternate versions of the search phrase 202. The search type 204 may be selected from the group consisting of a brand type, a person type, and a phrase type. The brand type, person type, and phrase type will be described in more detail hereafter.

The timestamp 206 may record the time of the search. In one embodiment, the timestamp 206 records the time at the initiation of the search. Alternatively, the timestamp 206 records the time at the completion of the search. In one embodiment, the timestamp 206 records the time interval of the search.

The search entry 201 includes one or more search results 205. Each search result 205 may include a discreet result from a specified data source 110 as will be described hereafter.

The search preferences 216 may record the preferences used in the search. The preferences may include past searches, past search results, past selected search results, ratings of past search results, geographic preferences, topical preferences, and the like. In one embodiment, the search preferences specify limitations on the languages that are searched, negative limitations such as words and phrases that exclude a search result 205 from consideration.

The search origin 218 may include the IP address from which the search is performed. In one embodiment, the search origin 218 specifies the search computer 105.

FIG. 4 is a schematic block diagram illustrating one embodiment of a search result 205. The search result 205 is a search result 205 of FIG. 3. The search result 205 includes a data source record 207, position data 208, sentiment data 210, geographic data 212, a review rating 214, language data 220, and raw data 222.

The data source record 207 specifies the data source 110 from which the search result 205 was received. In one embodiment, the data source record 207 includes a Universal Resource Locator (URL). Alternatively, the data source record 207 may include a name. For example, the data source record 207 may record the search results 205 from a GOOGLE® search with the URL "google.com" or from a BING® search with the URL "bing.com." The position data 208 may specify a position of the search result 205 for the search. If a search returns multiple search results 205 arranged in a positional order, the position data 208 records the position of the search result 205 within the positional order. For example, the position data 208 may include a page number and a page position. In one embodiment, the position data 208 also includes a position value. The position value may be determined from the page number and the page position as will be described hereafter.

The sentiment data 210 may record words, phrases, and images that indicate sentiment. In one embodiment, the sentiment data 210 includes a sentiment score for each word, phrase, and/or image as will be described hereafter. In addition, the sentiment data 210 may include a sentiment score for the search result 205.

The geographic data 212 may specify a geographic location associated with the search result 205. For example, if the search result 205 is from a review on a San Diego-based website, the geographic data 212 may record that the geographic location of the search result 205 is San Diego.

The review rating 214 may include a numerical rating from a review. For example, if the review includes a rating with a scale of 1 to 5 stars, the review rating 214 may record the number of stars of the review.

The language data 220 may specify the language of the search results 205. For example, a Spanish-language search result 205 may be recorded as Spanish in the language data 220. The raw data 222 may record all the text and images of the search result 205.

Figure 5:
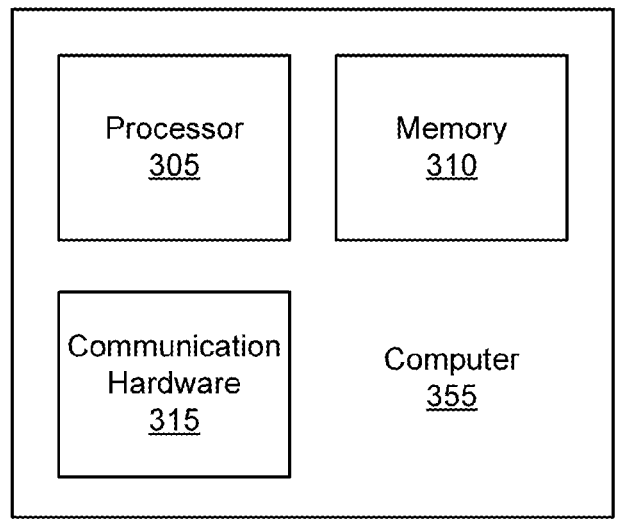
FIG. 5 is a schematic block diagram illustrating one embodiment of a computer.

FIG. 5 is a schematic block diagram illustrating one embodiment of a computer 355. The computer 355 includes a processor 305, a memory 310, and communication hardware 315. The memory 310 may be a computer readable storage medium such as a semiconductor storage device, a hard disk drive, a holographic storage device, a micromechanical storage device, or the like. The memory 310 may store program code. The processor 305 may execute the program code. The communication hardware 315 may communicate with other devices.

The computer 355 may be embodied in the server 120. Alternatively, the computer 355 may be embodied in the search computer 105.

Figure 6:
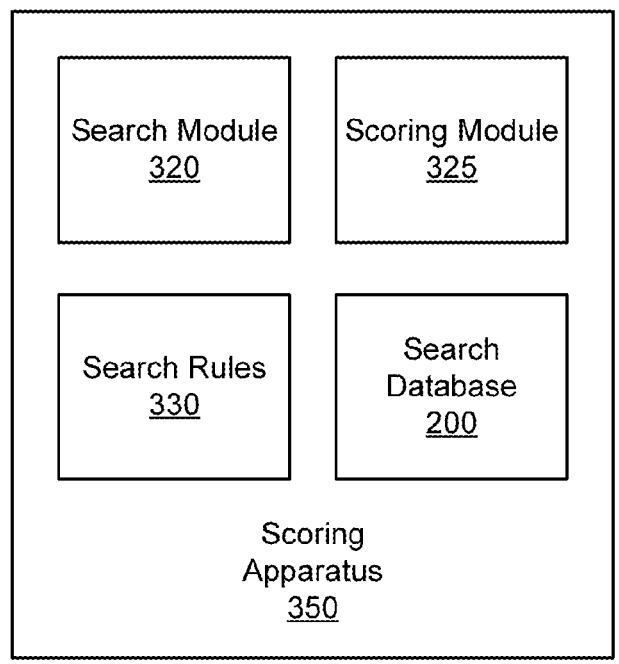
FIG. 6 is a schematic block diagram illustrating one embodiment of a scoring apparatus.

FIG. 6 is a schematic block diagram illustrating one embodiment of the scoring apparatus 350. The apparatus 350 may be embodied in the computer 355. The apparatus 350 may include a search module 320, scoring module 325, search rules 330, and the search database 200.

The search module 320, the scoring module 325, the search rules 330, and the search database 200 may be embodied in a computer readable storage medium such as the memory 310 storing program code. The program code may be executed by the processor 305 to perform the functions of the search module 320, the scoring module 325, the search rules 330, and the search database 200.

The search module 320 may initiate a search using the search phrase 202, the search rules 330, the search preferences 216 and the search origin 218. The search module 320 may further retrieve a plurality of search results 205 for the search phrase 202 from one or more specified data sources 110. The scoring module 325 may calculate an Internet score as a function of a sentiment value for each of the plurality of search results 205.

The search rules 330 may specify how each search is conducted. The search rules 330 may include but are not limited to URLs for data sources 110, Application Program Interfaces for accessing data sources 110, account credentials for accessing data sources 110, and the like.

FIG. 7 is an illustration of one embodiment of displayed search results 270. The displayed search results 270 are exemplary of search results 205 that may be returned by a search engine data source 110b for the phrase "TOP BRAND." Each search result 205 includes a position 272. The position 272 may be recorded as position data 208. For example, a first position 272a may be recorded as page 1, position 1.

Each search result 205 may also include a link 274. The link 274 may be recorded as the data source record 207. Search results 205 may be received as HyperText Markup Language (HTML) formatted data. Alternatively, search results 205 may be received in an eXtensible Markup Language (XML) format, as a delimited flat file, or in a format specified by an API.

FIG. 8 is an illustration of one embodiment of sentiment identification. The sentiment information may be parsed from a search result 205. In one embodiment, the sentiment information is parsed from the listing of a plurality of search results 205 such as may be returned by a search engine data source 110b. Alternatively, the sentiment information may be parsed from a source of the search result 205, such as a Web page, XML file, formatted data, or other data source 110 communicated with through a link 274.

In one embodiment, the search phrase 202 is identified. The sentiment of the search result 205 may be determined from words and images in proximity to the search phrase 202. In one embodiment, words within a specified word range of the search phrase 202 are analyzed for sentiment. The word range may be in the range of 10 to 150 words.

In addition, images may be analyzed for sentiment. For example, an exclamation point, a checkmark, a thumbs-up image, 5 stars, and the like may be indicative of positive sentiment. Similarly, a thumbs down image, a single star, and the like may be indicative of negative sentiment.

Sentiment words 244 and images are identified within the word range. In one embodiment, all words and images within the word range are compared to a database of sentiment words. Words and images from within the word range that match entries in the sentiment word database may be recorded as sentiment data 210.

In one embodiment, a sentiment value from the sentiment word database may also be recorded as sentiment data 110. In a certain embodiment, a sentiment value of 1 is recorded for positive sentiment and a sentiment value of −1 is recorded for negative sentiment. A sentiment value of 0 may be recorded for neutral sentiment.

FIG. 9 is an illustration of one embodiment of sentiment scoring 260. Sentiment words 244 from FIG. 8 are shown listed as table entries 264. Each table entry 264 is associated with a sentiment value 266. The sentiment value 266 may be indicative of the degree of positive or negative sentiment. The sentiment values 266 may be summed to calculate a sentiment score for the search result 205.

FIG. 10 is an illustration of one embodiment of position and sentiment scoring 280. In the depicted embodiment, search results 205 for each position 274 from a search of a search engine data source 110b are recorded. A position indication 282 is recorded if the search phrase 202 is founded each position 274. In addition, a sentiment value 266 is calculated for each search entry 205.

In one embodiment, the search result 205 is marked as special in response to satisfying special criteria. Search results from websites with .gov and/or .edu top-level domain names may satisfy the special criteria. Similarly, search results from websites that exceed a traffic threshold may satisfy the special criteria. For example, the top 0.01 percent of websites in terms of traffic may satisfy the special criteria. In one embodiment, search results from websites on a list satisfy the special criteria. The list may include specified news websites, encyclopedia websites, the websites of academic journals, and the like.

Figure 11:
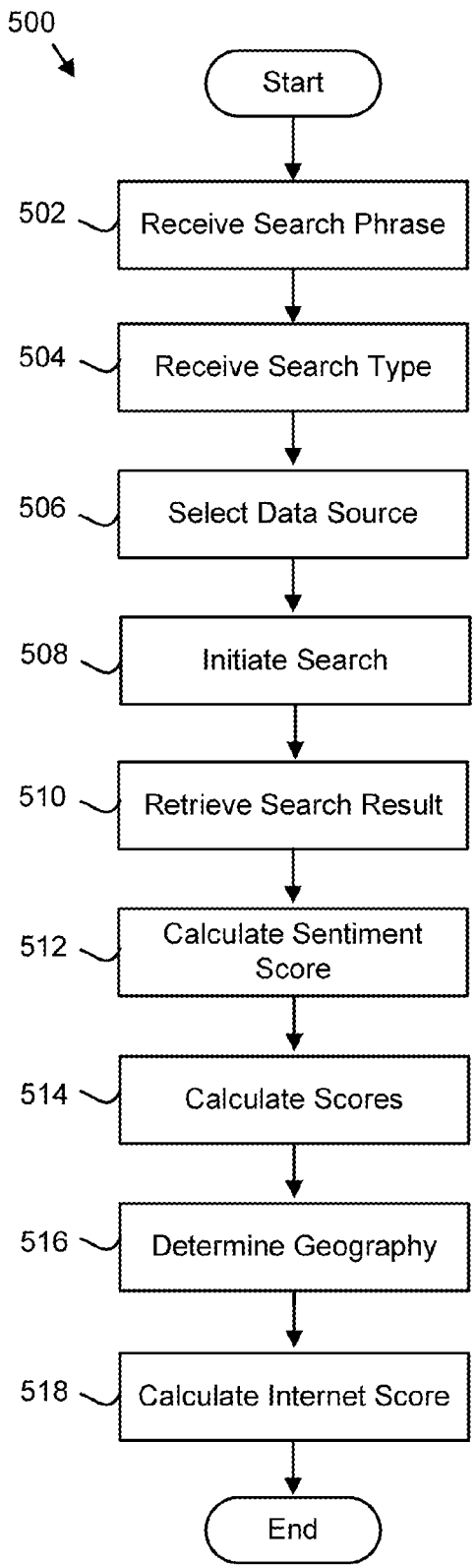
FIG. 11 is a schematic flow chart diagram illustrating one embodiment of an Internet presence scoring method.

FIG. 11 is a schematic flow chart diagram illustrating one embodiment of an internet presence scoring method 500. The method 500 may perform the functions of the system 100 and the apparatus 350. In one embodiment, the method 500 is performed by the processor 305. Alternatively, the method 500 is performed by a computer readable storage medium such as the memory 310 storing program code. The processor 305 may execute the program code to perform the method 500.

The method 500 starts, and in one embodiment the search module 320 receives 502 the search phrase 202. The search phrase 202 may be received 502 when a search 201 is created. The search phrase 202 may be a word, a phrase, an image description, an image, a simplified image, or the like. In one embodiment, the search phrase 202 is parsed from an optically scanned code. The optically scanned code may be a Quick Response (QR) code. For example, the search phrase 202 may be parsed from a QR code scanned from a product label using a mobile telephone and/or tablet computer.

The search module 320 may also receive 504 a search type 204. The search type 204 may be received 504 when the search 201 is initialized. In one embodiment, the search type 204 is specified with radio buttons on a user interface. Alternatively, the search type CCIV may be inferred from the search phrase 202.

In one embodiment, the search module 320 selects 506 a specified data source 110 in response to the search type 204. For example, if the search type 204 is a phrase search type, the search module 320 may select 506 one or more social media data sources 110a, one or more search engine data sources 110b, and one or more media data sources 110d. In one embodiment, the specified data source 110 is selected 506 from a list associated with each search type 204.

In a certain embodiment, if the search type 204 is a brand search type, the search module 320 may select 506 one or more social media data sources 110a, one or more search engine data sources 110b, one or more review data sources 110e, and one or more media data sources 110d. In addition, if the search type 204 is a person search type, the search module 320 may select 506 one or more social media data sources 110a, one or more search engine data sources 110b, one or more secured data sources 110c, and one or more media data sources 110d. In one embodiment, the search module 320 selects 506 the data sources 110 based on the search preferences 216.

The search module 320 may initiate 508 the search. In one embodiment, the search module 320 initiates 508 the search by communicating the search phrase 202 to each of the specified data sources 110. The search module 320 may also communicate one or more commands such as a command to start the search. In addition, the search module 320 may communicate the search preferences 216 to the data source 110. For example, the search module 320 may communicate geographic preferences, negative search terms, and the like to the data source 110. In one embodiment, search results 205 are excluded if negative search terms are included. The search module 320 may also initiate the search through an API, by communicating an XML file, or the like.

The search module 320 may retrieve 510 a search result 205 from the data source 110. One of skill in the art will recognize that the embodiments may be practiced with a plurality of data sources 110 and a plurality of search results 205. For simplicity, the data sources 110 and the search results 205 may be referred to in the singular.

The scoring module 325 may calculate 512 a sentiment value 266 for each search result 205. In one embodiment, each sentiment word 244 in the search result 205 is identified. In addition, a sentiment value 266 may be determined for each sentiment word 244. In a certain embodiment, the search result sentiment value SV may be calculated using Equation 1, where SW is the sentiment value 266 for each sentiment word 244 in the search result 205.

$$SV = \rho SW \qquad \text{Equation 1}$$

In one embodiment, the search result sentiment value is normalized to a positive number such as 1 if the search result sentiment value is positive and to a negative number such as −1 if the search result sentiment value is negative. A search result sentiment value of zero may indicate neutral sentiment.

In one embodiment, the scoring module 325 calculates 514 scores. The scores may include a search score SR, a social score SO, a review score RV, a secure site score SE, and the media score ME. In one embodiment, the search score, the social score, the review score, the secure site score, and the media score are each only calculated if search results 205 are received for the respective score that exceed a minimum search threshold. The minimum search threshold may be in the range of 2-8 search results 205. For example, the minimum search threshold may be 4, and review score may only be calculated if 4 or more review search results 205 are received.

The search score may be calculated for search results 205 from search engine data sources 110b. In one embodiment, the search score SR may be calculated as a function of a position value of each search result 205 and the corresponding sentiment value 266 for the search result 205. The search score for a single search result SRS may be calculated using Equation 2, where PV is the position value and SV is the sentiment value 266 for each sear result 205.

$$SRS = PV * SV \qquad \text{Equation 2}$$

The search scores SR for a plurality of N search engines search results 205 may be calculated as shown in Equation 3, where $T_S$ is a constant assigned to the search engine data source 110b of the single search result $SRS_N$. $T_S$ may be a non-zero constant.

$$SR = \Sigma T_S * SRS_N \qquad \text{Equation 3}$$

In an exemplary embodiment, the position value is determined using Table 1, where the position 274 of a search result 205 is translated into a position value.

TABLE 1

| Position | Position Value | Alternate Position Value |
|---|---|---|
| Page 1, Position 1 | 3 | 10 |
| Page 1, Position 2 | 2.97 | 5 |
| Page 1, Position 3 | 2.94 | 2 |
| Page 1, Position 4 | 2.91 | 1 |
| Page 1, Position 5 | 2.88 | 1 |
| Page 1, Position 6 | 2.85 | 1 |
| Page 1, Position 7 | 2.82 | 0.9 |
| Page 1, Position 8 | 2.79 | 0.8 |
| Page 1, Position 9 | 2.76 | 0.7 |
| Page 1, Position 10 | 2.73 | 0.6 |
| Page 2, Position 1 | 2.7 | 0.3 |
| Page 2, Position 2 | 2.673 | 0.3 |
| Page 2, Position 3 | 2.646 | 0.3 |
| Page 2, Position 4 | 2.619 | 0.3 |
| Page 2, Position 5 | 2.592 | 0.3 |
| Page 2, Position 6 | 2.565 | 0.3 |
| Page 2, Position 7 | 2.538 | 0.3 |
| Page 2, Position 8 | 2.511 | 0.3 |
| Page 2, Position 9 | 2.484 | 0.3 |
| Page 2, Position 10 | 2.457 | 0.3 |

In one embodiment, only organic search results 205 are used in determining the search score. In an alternate embodiment, both organic search results 205 and paid search results 205 are used in determining the search score. One of skill in the art will recognize that the embodiments may be practiced with other position values.

The social score SO may be calculated for search results 205 from social media data sources 110a. The search results 205 from the social media data sources 110a may comprise at least one of mentions, total connections, recent connections, views, and profile displays. Mentions may be posts of images and/or text. For example, a posting of a text that included the search phrase 202 may be a mention.

A response is a post by an account other than the originating account, referred to hereafter as a non-originating account that is directed to a mention, a profile, or the like, such as a "like" of the post that includes the search phrase 202 by the non-originating account The response may also be a comment from a non-originating account on the post by the originating account that includes the search phrase 202. Responses may be included as mentions. Alternatively, mentions may be limited to posts by originating accounts and may not include responses. In one embodiment, a response is only included in calculations if the response includes the search phrase 202. Alternatively, a response is included in calculations if the response is directed to a mention that includes the search phrase 202.

Total connections may be a number of a number of linked accounts such as friend accounts, colleague accounts, a number of followers, and the like. Recent connections may be recently added linked accounts, links, followers, and the like during a specified time interval. Profile displays may be a number of displays of a user profile. For example, a profile displays may include the viewing of the account profile by another account. Alternatively, profile displays may be a number of displays of the user profile during a specified time interval. The specified time interval may be in the range of 2 to 12 weeks.

In one embodiment, the social score SOS for a single social media search result 205 is calculated as shown in Equation 4, where AV is an account valuation, CV is a community valuation, SV is the sentiment value 266 for the search result 205, and A1-3 are non-zero constants.

$$SOS = \Sigma A1 * AV + A2 * CV + A3 * SV \qquad \text{Equation 4}$$

The account valuation AV may be calculated for the originating account. For example, if a search result is a TWITTER® tweet, the account valuation is calculated for the account originating the tweet. In one embodiment, the account valuation is calculated as a function of a repeat value, a reply value, a follower value, a follower-to-following value, and a verify value.

The repeat value may be a function of repeat actions such as retweets, forwards, and the like of mentions for the account. In one embodiment, a repeat action is a retransmission of a mention of the originating account by another account. In one embodiment, the repeat value is calculated as a number of repeat actions within the specified time interval. The specified time interval may be in the range of 1 to 12 months. Alternatively, the repeat value may be calculated as an average number of repeat actions. In one embodiment, the repeat value is only calculated if the number of repeat actions exceeds a minimum threshold of repeat actions for the account.

The reply value may be a function of responses to mentions. For example, the reply value may be a total number of responses for the account. Alternatively, the reply value is calculated as a number of responses within the specified time interval. In one embodiment, the reply value is only calculated if the number of responses exceeds a minimum threshold of responses for the account.

The follower value may be a function of the number of linked accounts connected to the account. Linked accounts may be friends, followers, and the like associated with and/or linked to the account. In one embodiment, the follower value FV is calculated using Equation 5, where $AV_N$ is the account value calculated for each account associate.

$$FV = \Sigma AV_N \quad \text{Equation 5}$$

The follower-to-following value may be a ratio of followers to those following for the source of the mention. In one embodiment, the follower-to-following value FF is calculated using Equation 6, where FR is a number of followers of the account and FG is a number of other accounts that the account is following.

$$FF = FR/FG \quad \text{Equation 6}$$

The verify value may be a function of mentions from verified accounts. A verified account is an account for which the identity of the account owner is verified. In one embodiment, the value of mentions, responses, and followers is increased for verified accounts, such as by multiplying the sentiment value 266 by a non-zero constant. In an alternative embodiment, the account valuation for an account is multiplied by non-zero constant if the account is a verified account.

The community valuation CV may be calculated as a function of tags and mentions for the account. For example, the community valuation may be increased if the mention is tagged with a tag that is used in a large number of mentions. Tags may be hashtags, categories, trending categories, or the like. In one embodiment, the community valuation CV is calculated using Equation 7, where NH is a number of tags and MN is a number of mentions and R1-2 are non-zero constants. In one embodiment R1-2 are dynamically varying constants that are calibrated by each search.

$$CV = R1*NH + R2*MN \quad \text{Equation 7}$$

Alternatively, the community valuation CV is calculated using Equation 8, where SVH is the sentiment value 266 of each tag and SVM is the sentiment value 266 of each mention.

$$CV = \Sigma R1*SVH + \Sigma R2*SVM \quad \text{Equation 8}$$

In one embodiment, the sentiment value SV for the search results 205 from the social media data sources 110a is calculated as a function of total mentions, negative mentions, and positive mentions. In a certain embodiment, the social media sentiment value is the sum of sentiment values for each mention.

In one embodiment, values are normalized to fall within a specified range. For example, values may be normalized all within the range of 0 to 100. In one embodiment, values are calculated by assigning an initial score of 50, and then increasing or decreasing the value in response to search results, account valuations, community valuations, and sentiment valuations.

The social score SO for a plurality of social media search results 205 may be calculated using Equation 9, where $J_S$ is a non-zero dynamic weight for the social media data sources 110a and $SW_N$ is a non-zero dynamic weight indicating a relative influence of the subject of the nth social score SOS for a single social media search result 205.

$$SO = \Sigma J_S * S_{WN} * SO_{SN} \quad \text{Equation 9}$$

The dynamic weight $J_S$ may be used to weight a social media data source 110a S more or less heavily than other social media data sources 110a. The dynamic weights $J_S$ may be based on a unique behavior and/or a valuation of each social media data source 110a and may be non-zero numbers. For example, a social media data source 110a with high traffic may have a higher $J_S$ value than a social media data source 110a with lower traffic. In one embodiment, $J_S$ is calculated from a traffic metric such as total posts, total views, and the like. Alternatively, $J_S$ may be calculated from a valuation of the social media data source 110a. The valuation of the social media data source 110a may be a function of popularity, an assigned value, a revenue value, and the like. In one embodiment, $J_S$ is calculated from a combination of behavior and valuation.

In one embodiment, the dynamic weight $J_S$ for a social score SOS for a single social media search result 205 is the dynamic weight value for the social media data source 110a at a time the source of the search result 205 was initially created. Alternatively, the dynamic weight $J_S$ for the social score SOS for the single social media search result 205 is the dynamic weight value for the social media data source 110 at a current time.

The dynamic weight $SW_N$ may be based on an influence metric of a subject of the search result 205. In one embodiment, the dynamic weight $SW_N$ for an nth social score SOS for a single social media search result 205 is the dynamic weight value for the subject of the social score SOS at a time the source of the search result 205 was initially created. Alternatively, the dynamic weight $SW_N$ for the nth social score SOS for a single social media search result 205 is the dynamic weight value for the subject of the social score SOS at a current time. For example, a $SW_N$ may be a rank of trending subjects. Alternatively, $SW_N$ may be a metric such as traffic, responses, and the like for a subject.

The dynamic weights $J_S$ and $SW_N$ are adjusted for each calculation of the social score SO. Alternatively, the dynamic weights $J_S$ and $SW_N$ may be calculated periodically and stored in a database.

The review score RV may be calculated for search results 205 from review site data sources 110e. In one embodiment, the search score RV may be calculated as a position value of each search result 205 multiplied by the sentiment value 266 for the search result 205. The review score for a single review search result RVS may be calculated using Equation 10, where PV is the position value and SV is the sentiment value 266.

$$RVS=PV*SV \qquad \text{Equation 10}$$

In one embodiment, the sentiment value 266 may be a function of the review rating 214. The review score RV for a plurality of review site search results 205 may be calculated as shown in Equation 11, where $M_S$ is a non-zero constant assigned to the search review site data source 110e of the search result 205 and $RVS_N$ is each review search result 205.

$$RV=\Sigma M_S*RVS_N \qquad \text{Equation 11}$$

The media score ME may be calculated as a number of search results 205 from media data sources 110d. In an alternative embodiment, the media score ME is calculated as a sum of sentiment values 266 for the search results 205 from the media data sources 110d. In a certain embodiment, the media score ME is calculated using Equation 12, where $SV_N$ is the sentiment value 266 for the search result 205 and $P_S$ is a non-zero constant assigned to the media data source 110d of the search result 205. If the sentiment value 266 for a media data source search result 205 cannot be determined, the sentiment value 266 may be a specified nonzero constant such as one.

$$ME=\Sigma P_S*SV_N \qquad \text{Equation 12}$$

The secure score SE may be calculated as a number of search results 205 from secure data sources 110c. In an alternative embodiment, the secure score SE is calculated as a sum of sentiment values 266 for the search results 205 from the secure data sources 110c. The search score SC may be calculated using Equation 13, where $SV_N$ is the sentiment value 266 for the secure data source search result 205 and $Q_S$ is a non-zero constant assigned to the secure data source 110c. If the sentiment value 266 for a secure data source search result 205 cannot be determined, the sentiment value 266 may be a specified non-zero constant such as one.

$$SE=\Sigma Q_S*SV_N \qquad \text{Equation 13}$$

The scoring module 325 may further determine 516 a geography for each of the search results 205. The geography may be recorded as geographic data 212. In one embodiment, each score is calculated for a specified geography.

The scoring module 325 may further calculate 518 the Internet score as a function of a sentiment value 266. The Internet score may be calculated as a function of the sentiment values 266 for each of the plurality of search results 205. The Internet score may be calculated as a function of the search score SR, the social score SO, the review score RV, the secure site score SE, and the media score ME.

In one embodiment, the Internet score I is calculated using Equation Alex, where k1, k2, k3, k4, and k5 are constants. In a certain embodiment, Equation Alex is used for the person search type.

$$I=k1*SR+k2*SO+k3*RV+k4*SE+k5*ME \qquad \text{Equation Alex}$$

In an alternate embodiment, the Internet score I is calculated using Equation Brandon. Equation Brandon may be used for a brand search type.

$$I=k1*SR+k2*SO+k3*RV+k5*ME \qquad \text{Equation Brandon}$$

In a certain embodiment, the Internet score I is calculated using Equation Nathan. Equation Nathan may be used for a phrase search type.

$$I=k1*SR+k2*SO+k5*ME \qquad \text{Equation Nathan}$$

In one embodiment, the constants k1, k2, k3, k4, and k5 have the ranges is specified in Table 2 for a person search type.

TABLE 2

| Constant | Low Value (%) | High Value (%) |
|---|---|---|
| k1 | 20 | 30 |
| k2 | 45 | 55 |
| k3 | 7 | 12 |
| k4 | 3 | 6 |
| k5 | 4 | 13 |

In one embodiment, the constants k1, k2, k3, k4, and k5 have the ranges specified in Table 3 for a brand search type.

TABLE 3

| Constant | Low Value (%) | High Value (%) |
|---|---|---|
| k1 | 30 | 40 |
| k2 | 15 | 25 |
| k3 | 25 | 35 |
| k4 | 0 | 0 |
| k5 | 8 | 13 |

In one embodiment, the constants k1, k2, k3, k4, and k5 have the ranges specified in Table 4 for the phrase search type.

| Constant | Low Value (%) | High Value (%) |
|---|---|---|
| k1 | 65 | 75 |
| k2 | 15 | 25 |
| k3 | 0 | 0 |
| k4 | 0 | 0 |
| k5 | 3 | 6 |

The constants k1-5 used in calculating the search score, the social score, the review score, the secure site score, and the media score and the Internet score may be adjusted in response to behaviors and trends of the data sources 110. For example, the constants k1-5 may be adjusted to increase the weight for social media data sources 110a over search engine data sources 110b if the social media data sources 110a increase in popularity. In one embodiment, the constants k1-5 are a function of the market capitalization of each of the types of data sources 110. Alternatively, the constants k1-5 may be a function of the relative traffic for each of the types of data sources 110.

In one embodiment, the presentation of details of the Internet score calculation depends on an account type. For example, calculation details may be presented for a paid premium account while only the Internet score is presented for a standard free account. The Internet score for a premium account may identify search results 205, data sources 110, and the like that significantly contributed to the Internet score.

Figure 12:
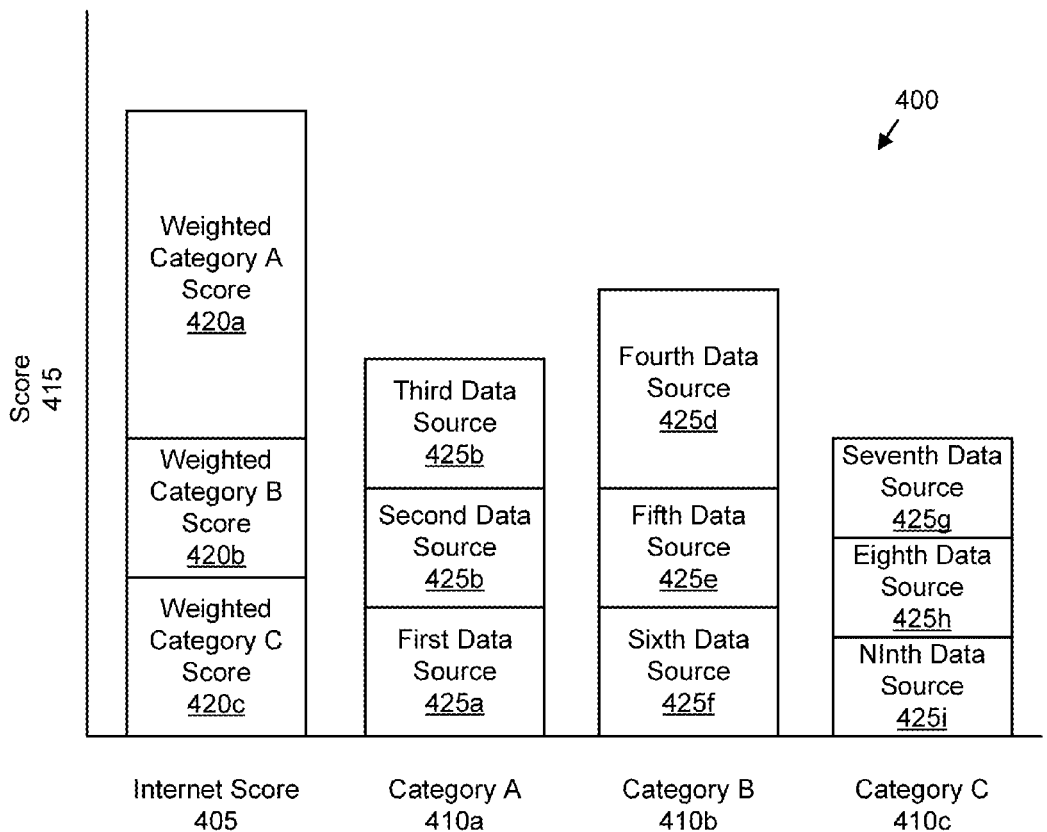
FIG. 12 is a graph illustrating one embodiment of calculating an Internet score.

FIG. 12 is a graph 400 illustrating one embodiment of calculating the Internet score 405. The graph 400 shows categories 410 and the Internet score 405 along the horizontal axis and a score 415 along the vertical axis. For each category 410, a score 425 is calculated for data sources 110. For example, category a 410a may be search engines, category B 410b may be social media, and category C 410c may be reviews. The scores 415 for each category may be weighted and summed as weighted category scores 420. The some of the weighted category scores may be the Internet score 405.

Figure 13:
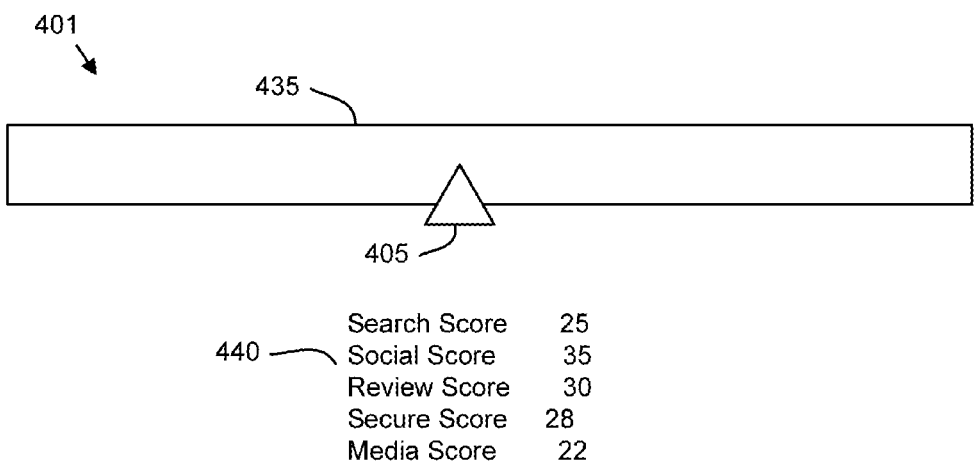
FIG. 13 is an illustration of one embodiment of a displayed Internet presence score.

FIG. 13 is an illustration of one embodiment of a displayed Internet presence score 401. The Internet presence score 401 may include a graph 435 displaying the Internet score 405. In addition, the Internet presence score 401 may include a summary 440 of the search score, the social score, the review score, the secure score, and the media score.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for internet presence scoring comprising:
receiving, by use of a processor, a search phrase;
receiving a search type selected from the group consisting of a brand type, a person type, and a phase type;
selecting a specified data source in response to the search type;
initiating a search;
retrieving a plurality of search results for the search phrase from the specified data source; and
calculating an Internet score as a function of a sentiment value for each of a search score, a social score, a review score, and a media score of the plurality of search results as $k1*SR+k2*SO+k4*SE+k5*ME$ where k1, k2, k4, and k5 are constants, SR is the search score, SO is the social score, SE is the secure site score, and ME is the media score.

2. The method of claim 1, wherein the search score is calculated for search results from search engines as a function of a position value of each search result from search engine data sources multiplied by a sentiment value for the search result.

3. The method of claim 1, wherein the social score is calculated for search results from social media as a function of an account valuation, a community valuation, and a sentiment valuation for each search result from social media data sources.

4. The method of claim 3, wherein the search results from the social media comprise at least one of mentions, total connections, recent connections, views, and profile displays.

5. The method of claim 1, wherein the review score is calculated for search results from review sites as a function of a position value of each search result from the review sites and the sentiment value for each search result.

6. The method of claim 1, wherein the sentiment value is a positive specified value for a positive sentiment phrase and a negative specified value for a negative sentiment phrase.

7. The method of claim 1, wherein the sentiment value is calculated as a sum of sentiment values for each sentiment phrase in the search result.

8. The method of claim 1, wherein the secure site score is calculated as a number of search results from specified secure sites.

9. The method of claim 1, wherein the media score is calculated as a number of search results from specified media sites.

10. The method of claim 1, wherein the search phrase is parsed from an optically scanned code.

11. The method of claim 10, wherein the optically scanned code is a Quick Response (QR) code.

12. The method of claim 1, wherein k1, k2, and k5 are non-zero constants and k3 and k4 are zero for a phrase search type, k1, k2,k3 and k5 are non-zero constants and k4 is zero for a brand search type, and k1, k2,k3, k4, and k5 are non-zero constants for a person search type.

13. The method of claim 1, wherein preferences are employed to initiate the search.

14. The method of claim 1, wherein a specified search computer is used to initiate the search.

15. The method of claim 1, wherein the Internet score is calculated if a number of search results exceed a search threshold.

16. An apparatus comprising:
a computer readable storage medium storing program code;
a processor executing the program code, the program code comprising:
code that receives a search phrase;
code that receives a search type selected from the group consisting of a brand type, a person type, and a phrase type;
code that selects a specified data source in response to the search type;
code that initiates a search;
code that retrieves a plurality of search results for the search phrase from the specified data source; and
code that calculates an Internet score as a function of a sentiment value for each score of a search score, a social score, a review score, and a media score of the plurality of search results as $k1*SR+k2*SO+k4*SE+k5*ME$ where k1, k2, k4, and k5 are constants, SR is the search score, SO is the social score, SE is the secure site score, and ME is the media score.

17. The apparatus of claim 16, wherein the search score is calculated for search results from search engines as a function of a position value of each search result from search engine data sources multiplied by a sentiment value for the search result.

18. The apparatus of claim 16, wherein the social score is calculated for search results from social media as a function of an account valuation, a community valuation, and a sentiment valuation for each search result from social media data sources and the search results from the social media comprise at least one of mentions, total connections, recent connections, views, and profile displays.

19. The apparatus of claim 16, wherein the review score is calculated for search results from review sites as a function of a position value of each search result from the review sites and the sentiment value for each search result.

20. The apparatus of claim 16, wherein the sentiment value is a positive specified value for a positive sentiment phrase and a negative specified value for a negative sentiment phrase.

* * * * *